April 12, 1932. P. MAIWURM 1,853,312

AIRCRAFT LANDING GEAR

Filed July 29, 1929

INVENTOR.
PAUL MAIWURM
BY
A.B. Bowman
ATTORNEY.

Patented Apr. 12, 1932

1,853,312

UNITED STATES PATENT OFFICE

PAUL MAIWURM, OF SAN DIEGO, CALIFORNIA

AIRCRAFT LANDING GEAR

Application filed July 29, 1929. Serial No. 381,712.

My invention relates to aircraft landing gear and the objects of my invention are: first, to provide a landing gear for aircraft in which the normally exposed struts are eliminated; second, to reduce to a minimum the head resistance of a landing gear of an aircraft; third, to considerably increase the strength of and reduce the weight of aircraft landing gear; fourth, to provide a landing gear of greater inherent stability; fifth, to provide wheel axles for landing gear adapted to swing around a pivotal point in a vertical plane; sixth, to provide a landing gear in which the strain consequent to the shock in landing and taking off is localized; seventh, to provide a landing gear structure in which lateral alinement of the wheel axles is readily maintained, and eighth, to provide a landing gear for aircraft which is relatively simple of construction, economical of manufacture, simple, durable and which will not readily deteriorate or get out of order.

Figure 1:
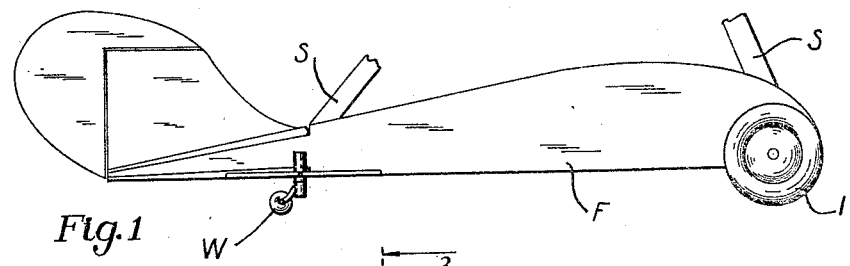
Figure 2:
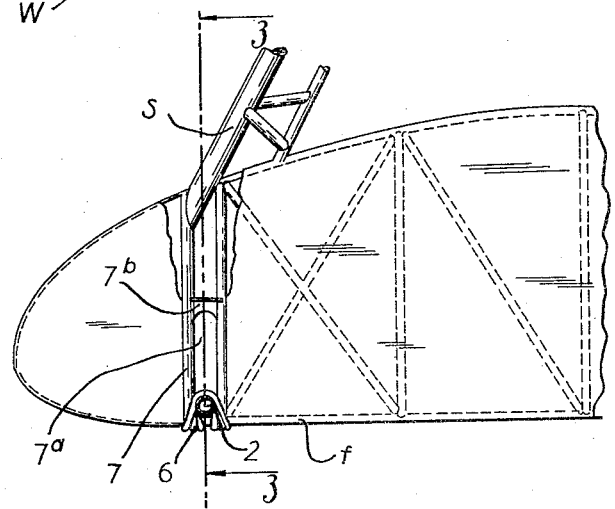
Figure 3:
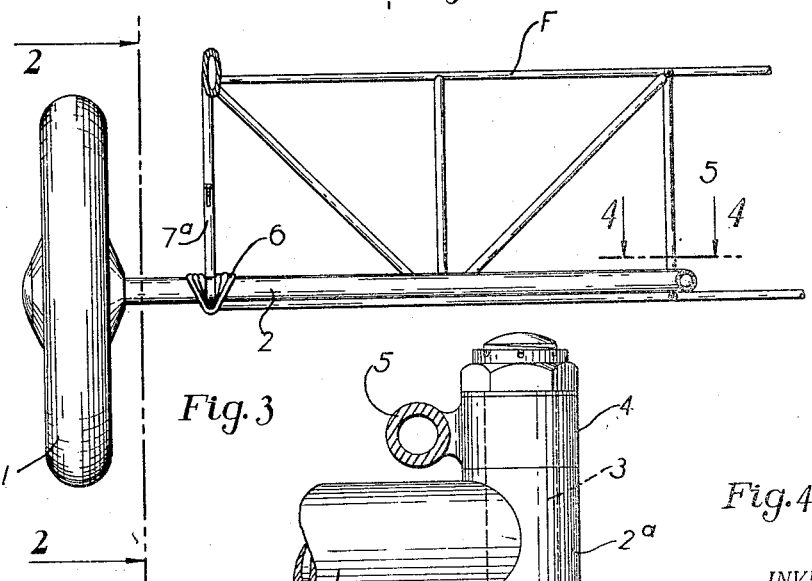
Figure 4:
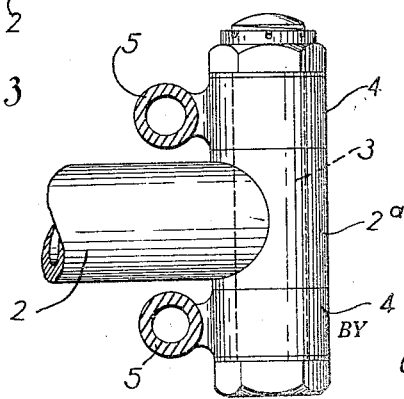

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon, which form a part of this application, in which:

Figure 1 is a side elevational view of the fuselage and landing gear for aircraft as described in my United States Patent No. 1,743,637, issued January 14, 1930; Fig. 2 is a fragmentary side view as seen from the line 2—2 in Fig. 3, certain parts and portions being shown broken away in order to facilitate the illustration; Fig. 3 is a sectional view taken along the line 3—3 in Fig. 2, and Fig. 4 is an enlarged fragmentary view seen from the line 4—4 in Fig. 3, showing the manner in which the axle is secured to the fuselage to which the landing gear is attached.

Similar characters of reference refer to similar parts and portions throughout the several views of the drawings.

The wheel 1, axle 2, pivot bolt 3, trunnions 4, uprights 5, and shock absorber 6, form the principal parts and portions of my novel landing gear; it being understood that these parts are provided on either side of the fuselage for forming a complete landing gear.

As shown in Fig. 1, the externally covered fuselage F follows a stream line form and the landing gear is secured to the forward end thereof. The rear or tail end is preferably supported by means of a pair of pivotally mounted wheels W. As illustrated in Fig. 3, which shows one side only of the fuselage and landing gear, the wheel 1 is mounted at the end of the axle 2 which extends laterally within the fuselage F adjacent the bottom thereof. The outer end of the axle 2 passes between a pair of spaced-apart upright members 7 forming a part of the side of the fuselage, and over the lower corner member $f$ of the fuselage to which the upright members 7 are secured at their lower end. The upright members 7 form a vertical slot $7a$ in which the axle 2 is free to oscillate. The bracing member $7b$ positioned intermediate the ends of the upright members 7 limits the upward movement of the axle.

The inner end of the axle is provided with a bearing portion $2a$ extending at right angles to the axis of the axle and is adapted to be journalled on a pivot bolt 3. The latter is supported in a horizontal position between a pair of upright members 5 forming a part of the fuselage which are provided with laterally extending trunnion members 4 adapted to receive the bolt 3, the trunnion members 4 being in axial alinement. The outer end of the axle is resiliently secured to the corner portion $f$ of the fuselage by means of the shock absorber 6 which is in the form of a heavy rubber strap or rope wrapped alternately over the axle and under the corner member $f$ of the fuselage, thus resiliently restraining the axle from vertical movement.

As the major portion of the wheel axle extends within the fuselage, the outer surface of which is entirely covered, the gear presents practically no wind resistance, while practically the entire strain on the landing gear when taking off and landing, is borne by the upright members 7 and the therewith connected main supporting struts S, which are made of adequate strength and properly braced to take the strain. In consequence the greater part of the fuselage structure may be made of relatively light material and designed according to the weight of the load to be carried.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a device of the class described, a fuselage having an external covering, vertically extending slots in each side of the fuselage near the forward end, wheel axles extending through said slots and pivotally secured at their inner ends to said fuselage in spaced relation to each other allowing said axles to separately oscillate within said slots, means for resiliently restraining said oscillatory movement, and stop means for limiting said movement.

2. In a device of the class described, a fuselage having an external covering, a pair of vertical, parallel, spaced-apart, upright members position in each side of the fuselage near the front end thereof, a portion of the space between said upright members being uncovered, forming a vertical slot in the sides of the fuselage, wheel axles extending laterally through said slots and pivotally secured at their inner ends to said fuselage in spaced relation to each other so as to be free to oscillate independently of each other in said slots, resilient means securing said axles to the fuselage adjacent said slots and serving as shock absorbers for said axles.

3. The combination with the fuselage of an aircraft, of landing gear means including wheels positioned at the sides of said fuselage, the center of said wheels lying above the adjacent lower fuselage surface, a pair of separate wheel axles projecting through vertical slots in the sides of said fuselage and pivotally secured at their inner ends within said fuselage and free to oscillate in said slots independently of each other, and shock absorbing means resiliently restraining said axles from said oscillatory movement.

In testimony whereof, I have hereunto set my hand at San Diego, California, this 19th day of July, 1929.

PAUL MAIWURM.